UNITED STATES PATENT OFFICE.

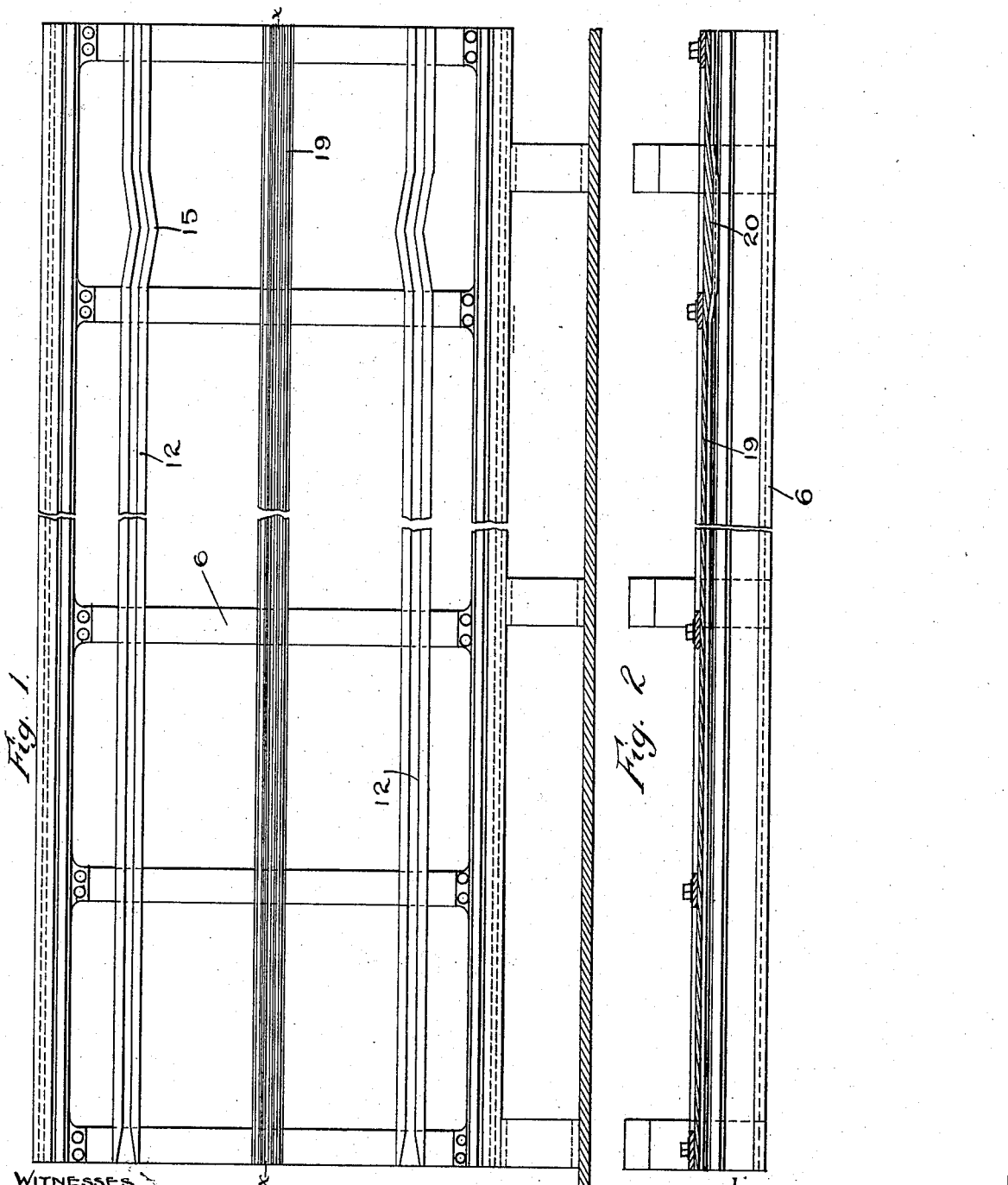

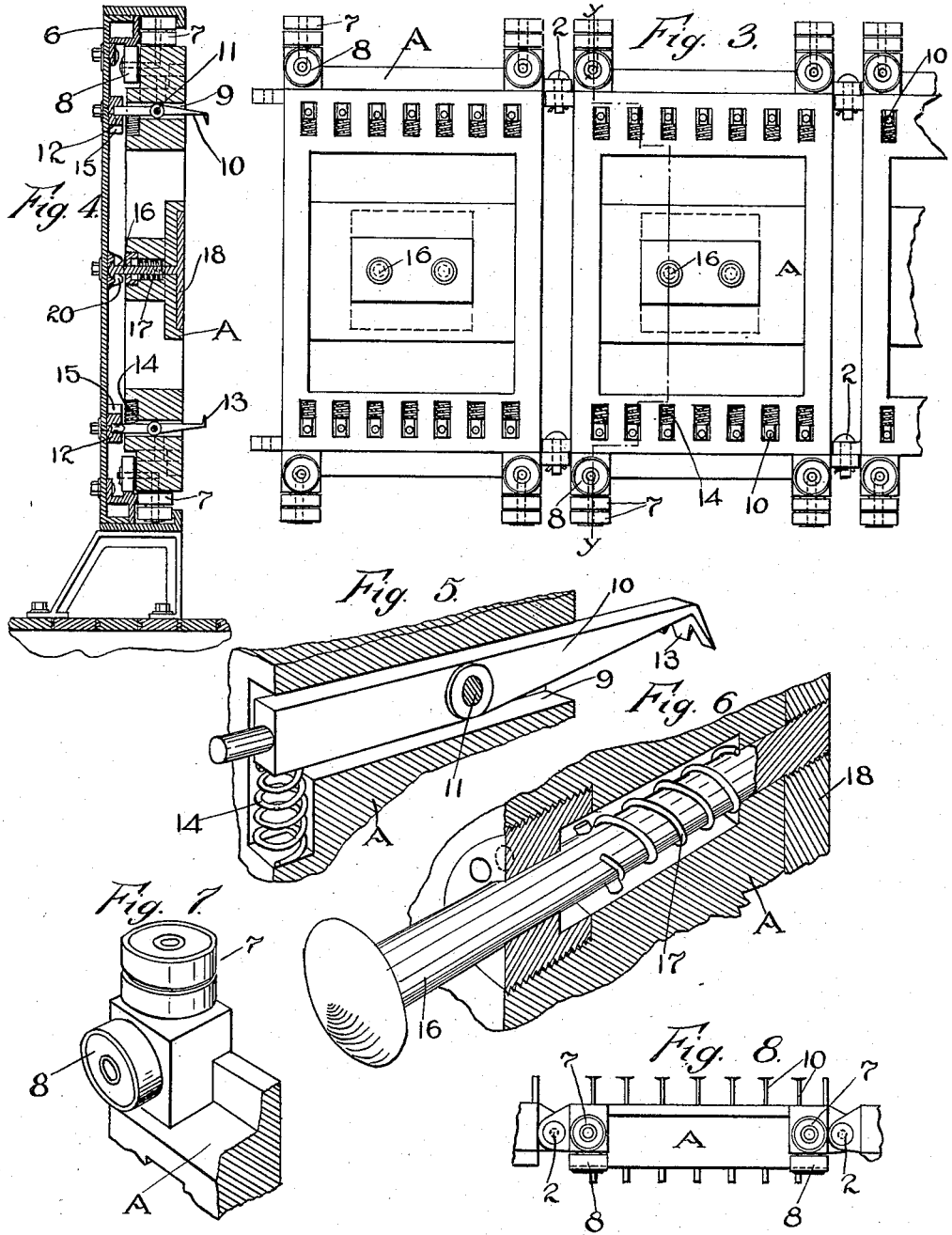

ARCHIE C. JEFFERSON, OF ST. PAUL, MINNESOTA.

SHINGLE-SAWING APPARATUS.

1,150,036. Specification of Letters Patent. Patented Aug. 17, 1915.

Application filed June 15, 1912. Serial No. 703,838.

*To all whom it may concern:*

Be it known that I, ARCHIE C. JEFFERSON, a citizen of the United States, residing at St. Paul, in the county of Ramsey and State of Minnesota, have invented certain new and useful Improvements in Shingle-Sawing Apparatus, of which the following is a specification.

My invention relates to improvements in shingle sawing apparatus, its object being particularly to provide improved means for supporting and carrying a plurality of shingle blocks past cutting saws and for releasing the shingle spalts, and consists in the features of construction, combination, and arrangement of parts hereinafter described and claimed.

In the accompanying drawings forming part of this specification, Figure 1 is a plan view of the guideway; Fig. 2 is a section on line $x-x$ of Fig. 1 inverted; Fig. 3 is a plan view of a series of shingle block carriers broken away; Fig. 4 is a section on line $y-y$ of Fig. 3; Fig. 5 is a detail of a block holding dog forming part of my invention; Fig. 6 is a detail of a spalt discarding device; Fig. 7 is a detail of guide rollers for the carriages; and Fig. 8 is a plan view of one of the carriage links.

As shown in the drawings, I employ an endless block conveyer composed of a plurality of vertically disposed carriages or links A having hinge connection 2. The said conveyer is suitably actuated, the actuating mechanism and the saw portion of the machine not being shown. The conveyer travels within guideways 6, each carriage supporting anti-friction guide rollers 7 upon its upper and lower sides and rear rollers 8 engaging with the guideways. Extending through openings 9 in each link is a plurality of opposed top and bottom dogs 10 each having central fulcrum support 11. The outer ends of said dogs travel within grooved rails 12 carried by the guideway and the inner ends are formed with inwardly directed points 13 to engage with the upper and lower sides of the shingle block. Restraining coil springs 14 are shown positioned in contact with the inner sides of the outer ends of the dogs. The grooved rails 12 are formed with inward bends 15 at the end of travel of the conveyer for the purpose of turning the dogs upon their fulcrums and releasing the supported blocks.

For the purpose of discarding the spalt from each carriage when released by the dogs I provide plungers 16 centrally slidable through each link, said plungers being normally pressed rearwardly by surrounding coil springs 17. The inner ends of the plungers support a plate 18 inset in the inner face of the carriage link, the outer ends of the plungers traveling in a grooved rail 19 centrally supported by the guideway. The rail 19 at the proper point is formed with a forwardly extending portion 20 for the purpose of thrusting the plungers forwardly when brought into contact therewith to discard the released spalt from the carriage.

In operation the carriages will be operated in a suitable manner in connection with suitable shingle cutting saws not shown. At a predetermined point the guideways 6, as heretofore described, will actuate the dogs 10 to release the shingle spalt. The plungers will then, as heretofore pointed out, be actuated by the grooved rail 19 to discard the released spalt from the carriage.

I claim as my invention:

1. In a shingle sawing apparatus, the combination with a plurality of trackways, a series of block supporting elements carried by said trackways and linked together to form a continuous conveyer, upper and lower rows of block gripping devices pivoted in said elements and extending through the rear faces of the latter, control elements along said trackways to engage with the projecting ends of said devices to trip said devices at predetermined intervals, block ejecting means also on said linked elements extending through the rear faces of the latter, and further control elements in engagement with the extending ends of said ejecting means to operate the latter simultaneously with the block releasing movements of said block gripping devices.

2. In a shingle sawing apparatus, the combination with trackways, a series of pivotally connected block carrying links, opposed block gripping devices carried by each link, a block ejecting device carried by each link between the block gripping devices, and controlling elements in connection with said trackways engaging with the block gripping and ejecting devices at predetermined intervals to actuate the same.

In testimony whereof I affix my signature in presence of two witnesses.

ARCHIE C. JEFFERSON.

Witnesses:
H. S. JOHNSON,
H. SMITH.

Copies of this patent may be obtained for five cents each, by addressing the "Commissioner of Patents, Washington, D. C."